(12) United States Patent
Herbschleb et al.

(10) Patent No.: US 9,129,156 B2
(45) Date of Patent: Sep. 8, 2015

(54) METHOD FOR DETECTING AND RECOGNIZING AN OBJECT IN AN IMAGE, AND AN APPARATUS AND A COMPUTER PROGRAM THEREFOR

(75) Inventors: Ernst David Herbschleb, Dronrijp (NL); Peter Hendrik Nelis de With, Son en Breugel (NL)

(73) Assignee: Cyclomedia Technology B.V., Zaltbommel (NL)

(*) Notice: Subject to any disclaimer, the term of this patent is extended or adjusted under 35 U.S.C. 154(b) by 55 days.

(21) Appl. No.: 13/881,856

(22) PCT Filed: Oct. 28, 2011

(86) PCT No.: PCT/EP2011/068985
§ 371 (c)(1),
(2), (4) Date: Jun. 18, 2013

(87) PCT Pub. No.: WO2012/056002
PCT Pub. Date: May 3, 2012

(65) Prior Publication Data
US 2013/0259367 A1    Oct. 3, 2013

(30) Foreign Application Priority Data

Oct. 28, 2010   (EP) .................................... 10189225

(51) Int. Cl.
*G06K 9/00*      (2006.01)
*G06K 9/46*      (2006.01)
*G06K 9/34*      (2006.01)

(52) U.S. Cl.
CPC ........ *G06K 9/00523* (2013.01); *G06K 9/00818* (2013.01); *G06K 9/4652* (2013.01)

(58) Field of Classification Search
USPC ......... 382/103, 104, 106, 107, 164, 165, 181, 382/190, 201, 203, 209, 218–220, 284; 348/46, 148; 340/436, 901, 937; 700/48, 51; 701/1, 96; 706/20
See application file for complete search history.

(56) References Cited

U.S. PATENT DOCUMENTS

| | | | | |
|---|---|---|---|---|
| 6,727,807 | B2* | 4/2004 | Trajkovic et al. | 340/436 |
| 7,466,841 | B2* | 12/2008 | Bahlmann et al. | 382/103 |
| 8,064,643 | B2* | 11/2011 | Stein et al. | 382/104 |
| 8,134,480 | B2* | 3/2012 | Onome et al. | 340/937 |
| 8,638,990 | B2* | 1/2014 | Kudo | 382/104 |

(Continued)

OTHER PUBLICATIONS

Herbschleb Cyclomedia Technology BV (Netherlands) E et al., "Real time traffic sign detection and recognition", Visual Communications and Image Processing, Jan. 20, 2009-Jan. 22, 2009, San Jose, Jan. 20, 2009, XP030081718.

(Continued)

*Primary Examiner* — Amir Alavi
(74) *Attorney, Agent, or Firm* — The Webb Law Firm

(57) ABSTRACT

The present invention relates to an apparatus and method for detecting and recognizing an object in an image, the method comprising a plurality of stages, wherein at least one of the stages comprises an integrated approach of feature detection and object recognition of at least a part of the object. In a further embodiment at least one of the stages comprises identifying an image part that contains a feature point, and matching the image part to a set of hierarchies of templates, wherein a hierarchy comprises templates for an object to be recognized, a template describes at least a part of an object to be recognized, and a child template describes a sub-part of the part of the object described by its parent template.

18 Claims, 6 Drawing Sheets

(56) References Cited

U.S. PATENT DOCUMENTS

| | | | | |
|---|---|---|---|---|
| 8,725,309 | B2* | 5/2014 | Kubotani et al. | 701/1 |
| 2006/0215882 | A1* | 9/2006 | Ando et al. | 382/106 |
| 2012/0013713 | A1* | 1/2012 | Sumitomo | 348/46 |
| 2013/0201334 | A1* | 8/2013 | C et al. | 348/148 |
| 2013/0259367 | A1* | 10/2013 | Herbschleb et al. | 382/165 |

OTHER PUBLICATIONS

Paclik et al., "Building Road-Sign Classifiers Using a Trainable Similarity Measure", IEEE Transactions on Intelligent Transportation Systems, vol. 7 No. 3, Sep. 1, 2006, pp. 309-321, XP002626629.

Ettinger G J Ed —Institute of Electrical and Electronics Engineers, "Large hierarchical object recognition using libraries of parameterized model sub-parts", Proceedings of the Conference on Computer Vision and Pattern Recognition, Ann Arbor, Jun. 5-9, 1988 [Proceedings of the Conference on Computer Vision and Pattern Recognition], Washington, IEEE Comp. Soc. Press, US, vol. -, Jun. 5, 1988, pp. 32-41, XP010012824.

Koncar et al. "Garbor wavelet similarity maps for optimising hierarchical road sign classifiers", Pattern Recognition Letters, Elsevier, Amsterdam, NL, vol. 28, No. 2, Nov. 14, 2006, pp. 260-267, XP005762694.

Gavrila et al., "Multi-feature Hierarchical Template Matching Using Distance Transforms", Pattern Recognition, vol. 1, Aug. 16, 1998, pp. 439-444.

Van De Weijer et al., "Coloring Local Feature Extraction", Computer Vision —ECCV 2006 Lecture Notes in Computer Science; LNCS, Springer, Berlin, DE, pp. 334-348.

Zhang et al., "An Effective Local Invariant Descriptor Combining Luminance and Color Information", Multimedia and Expo, 2007 IEEE International Conference, Jul. 1, 2007, pp. 1507-1510.

Van De Sande et al., "Evaluating Color Descriptors for Object and Scene Recognition", Transactions on Pattern Analysis and Machine Intelligence, vol. 32, No. 9, Sep. 2010, pp. 1582-1596.

Creusen et al., "Color exploitation in hog-based traffic sign detection", Proceedings of IEEE, International Conference on Image Processing, Sep. 26-29, 2010, pp. 2669-2672.

Zickler et al., "Detection and Localization of Multiple Objects", Humanoid Robots, 2006, Dec. 2006, pp. 20-25.

* cited by examiner

METHOD FOR DETECTING AND RECOGNIZING AN OBJECT IN AN IMAGE, AND AN APPARATUS AND A COMPUTER PROGRAM THEREFOR

CROSS-REFERENCE TO RELATED APPLICATIONS

This national stage patent application under 35 U.S.C. §371 claims priority to PCT application no. PCT/EP2011/068985 filed Oct. 28, 2011, which claims priority to European Patent Office patent application no. 1018922.5 filed Oct. 28, 2010, the disclosures of each of which are incorporated herein by reference for all purposes.

BACKGROUND

The disclosure relates to a method for detecting and recognizing an object in an image.

The disclosure further relates to an apparatus configured for performing such a method.

Furthermore, the present disclosure relates to a computer program that, when executed on a processor, performs such a method.

The present disclosure also relates to a data carrier with such a computer program stored thereon.

During the last decade a vast amount of digital images has been structurally acquired on public roads. These digital images are being used extensively in, among others, the real estate market, infrastructural planning, and the investigation of local traffic situations by organizations such as governments, municipal authorities, real estate agents and insurance companies. For a major part, these images have been used in a non-automated fashion, wherein a person investigates a set of images and manually retrieves the required information from the images.

One interesting application of these images is to determine the location and type of road signs along public roads. This information is used by cartographers, for example to determine vehicle restrictions and speed restrictions of roads.

SUMMARY

The present disclosure seeks to provide an automated method for detecting and recognizing objects, in particular road signs, in digital images.

This object is reached by a method comprising a plurality of stages, wherein at least one of the stages comprises an integrated approach of feature detection and object recognition of at least part of the object. By combining different templates in a database for objects and using those templates to recognize the occurrence of a template at the detection phase, the recognition of that template is facilitated. By integrating the detection and recognition of an object, a higher accuracy is obtained in conjunction with a relatively high processing speed, as false candidates that strongly trigger the detector but score low in the recognition process, are removed from the process at an early stage of the process.

The present disclosure further provides a method, wherein at least one of the stages comprises: identifying an image part that contains a feature point; and matching the image part to a set of hierarchies of templates, wherein: a hierarchy comprises templates for an object to be recognized, a template describes at least a part of an object to be recognized, and a child template describes a sub-part of the part of the object described by its parent template. This way the detection and recognition process take place at more than one level in the hierarchy. For each hierarchy, level detection and recognition takes place in an integrated manner.

In another aspect of the disclosure, feature points are matched to a template only after they have been successfully matched to at least one of its child templates.

In again another aspect of the disclosure, the set of hierarchies of templates comprise a library.

In a further aspect of the disclosure, a method is provided, wherein a template in the library comprises an indication of the confidence of the detection/recognition.

Preferably, the matching comprises comparing colors in an identified image part to a color description in a template. This is specifically advantageous when detecting and recognizing colorful objects such as traffic signs.

In another aspect of the disclosure, the templates define a background mask, wherein the background mask determines areas to be ignored during matching, wherein an area comprises a group of pixels and/or a group of sub-pixels.

The present disclosure also provides a method wherein the objects to be detected and recognized comprise traffic signs.

In one embodiment of the disclosure, an apparatus is provided configured for performing a method according to the present disclosure.

In another embodiment, a computer program is provided, that, when executed on a processor, performs a method in accordance with the present disclosure.

In again another embodiment, a data carrier is provided with a computer program in accordance with the disclosure stored thereon.

BRIEF DESCRIPTION OF THE DRAWINGS

Embodiments of the present disclosure are illustrated in the following drawings which depict various embodiments according to the disclosure. These drawings are not intended to limit the scope of the disclosure.

DETAILED DESCRIPTION

Figure 1:
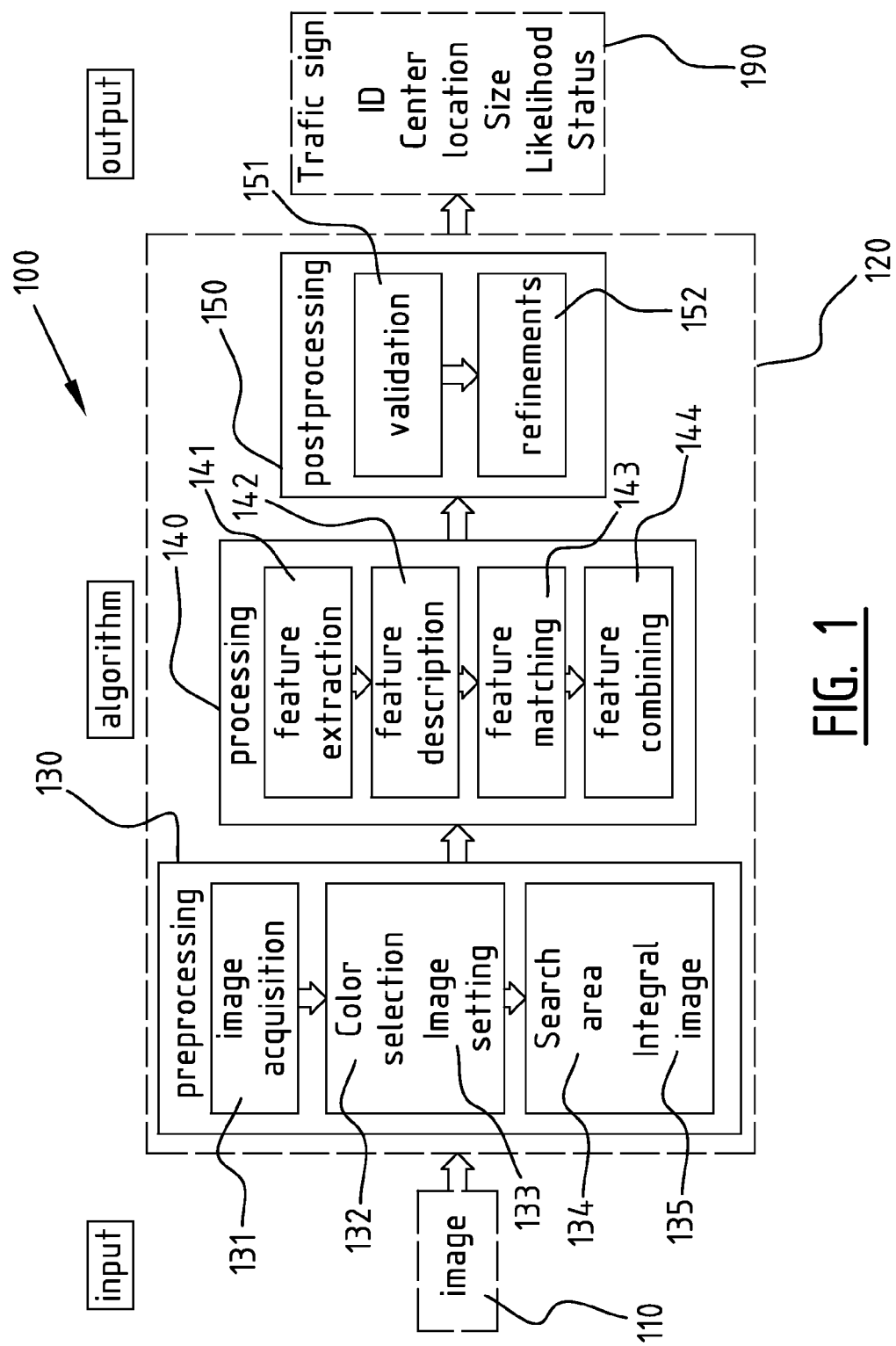
FIG. 1 illustrates a flow chart in accordance with embodiments of the present disclosure.

One specific method according to the present disclosure, the specific method being suitable for the detection and recognition of traffic signs, comprises three stages (FIG. 1): a processing stage 130 that pre-processes the input image 110, a processing stage 140, and a post-processing stage 150. The result is one or more traffic signs 190 that were detected and recognized in the image, with additional properties of the traffic signs and/or the detection and/or recognition of the traffic signs.

The processing stage 130 prepares the input image 110 for the processing stage 140. The processing stage 130 operates on the whole image 110.

The pre-processing stage 130 comprises several steps, such as: an image acquisition step 131, a color selection step 132, an image setting step 133, a search area step 134, and an integral image computation step 135.

The first step of the pre-processing stage 130 comprises the acquisition 131 of an image 110. The image 110 may be acquired straight from an image capture device, but will usually be read from a storage device. This image 110 is converted to the YCbCr color space. An example is the use of JPEG images as input. During the necessary decoding of the JPEG image, the YCbCr values of the pixels become available.

In the color selection step 132, the YCbCr space is used to classify the pixels in color classes relevant for the traffic signs to be detected. In alternative embodiments, other color spaces are used for the classification of pixels. In order to obtain a segmentation result from the input image 110, all pixels are individually classified depending on the value of their color components by testing the individual components independently. If they fall in a certain color range, or if the color components lead to a specific color combination, a pixel is classified in a respective color class. The resulting image is called the segmented image (with respect to color).

To obtain the image to filter, the luminance component is taken, adapted with the color components of the YCbCr color space. By subtracting the red difference color component from the blue difference color component, a larger gap between the different colors is generated. This difference is added to the luminance:

$$p(x,y) = Y(x,y) + a \cdot C_b(x,y) - b \cdot C_r(x,y),$$

wherein p(x, y) is the value of the pixel at coordinates (x, y) of the image-to-filter, Y(x, y) is the luminance at coordinates (x, y), $C_b$(x, y) is the blue difference component, $C_r$(x, y) is the red difference component from the YCbCr-image, and a and b are positive constants. This gives a higher contrast between the relevant colors.

The image-to-describe is built by converting the segmented image to a modified image with color indications to define the search area for signs and selecting the suitable descriptors.

Figure 2:
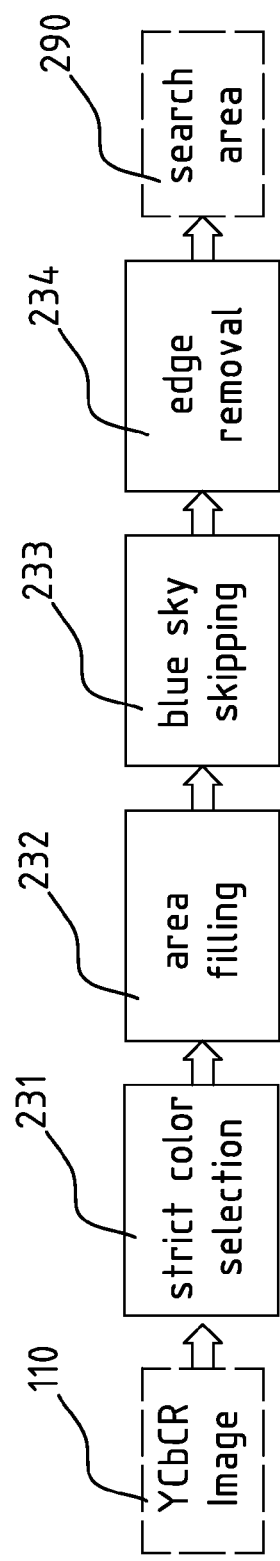
FIG. 2 illustrates a flow chart of a step from the flow chart of FIG. 1 in accordance with embodiments of the present disclosure.
Figure 3:
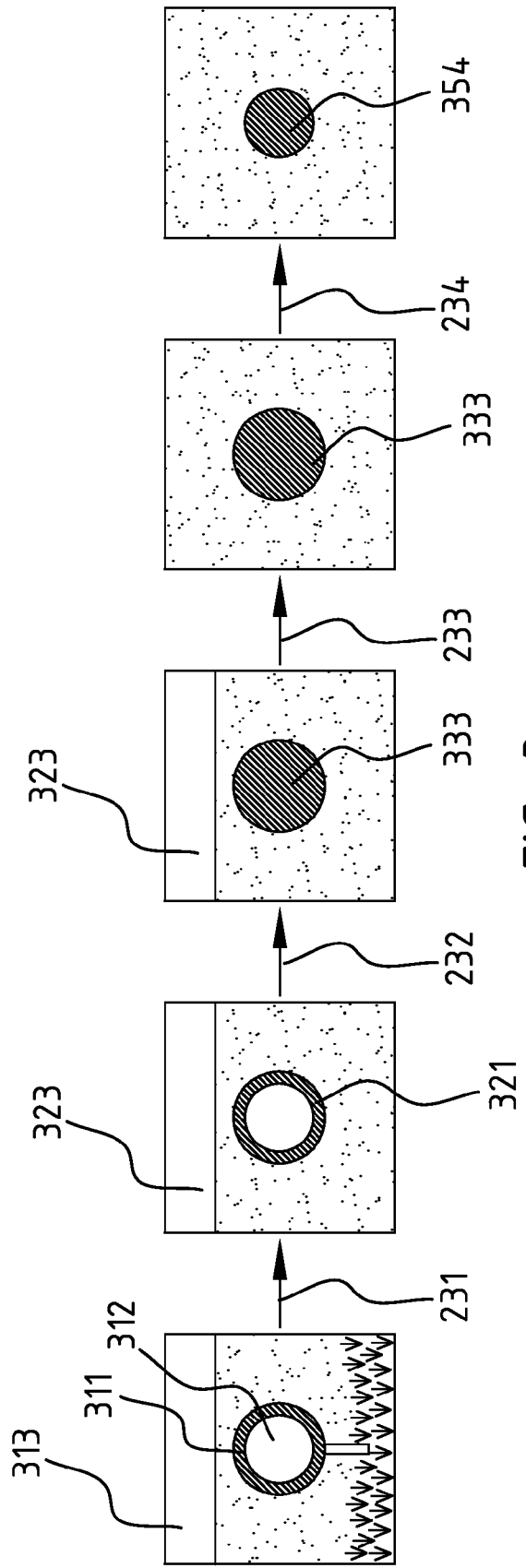
FIG. 3 illustrates a detail of FIG. 2 as applied to an image in accordance with embodiments of the present disclosure.

The search area step 134 comprises four sub-steps (FIG. 2), the sub-steps being further illustrated with an example in FIG. 3.

Strict Color Selection 231

Colors that are distinguishing for objects to be detected and recognized are selected, such as the colored outer band 311 of a traffic sign. The inner area 312 of a traffic sign is often white, which is hardly a distinguishing color in an image representing an outdoor scene. Therefore, no white areas 312 are initially selected. Next, the areas 321, 323 in the segmented image corresponding to the selected colors are selected for further searching. By limiting the colors that are added to the initial search area, this area is kept small. The smaller the area, the faster the remaining stages of the processing will be.

Area Filling 232

Areas 312 that are surrounded by the initial search area that resulted from step 231, are included in area 333 as these areas possibly belong to traffic signs. This increases the reliability of the detection and recognition.

Blue Sky Skipping 233

If blue is one of the colors added to the initial selected colors, areas 323 likely to represent blue sky 313 are removed in order to limit the search area.

Edge Removal 234

The edges of traffic signs contain more information about the background than about the sign itself. Therefore, the edges are removed in the inner area 354 for higher reliability.

In the next pre-processing step, the integral image computation step 135, the integral image of the image-to-filter is computed, because the usage of this image speeds up the processing stage. The integral image is given by $$I(x, y) = \sum_{i=1}^{x} \sum_{j=1}^{y} p(i, j)$$

where I(x, y) is the value of pixel of the integral image with coordinates (x, y), and p(i, j) is the value the image has on pixel coordinates (i, j). Integral images are known to the person skilled in the art of image processing.

The processing stage 140 uses the information determined in the pre-processing stage 130 to locate traffic signs in the image. The signs that are found are candidates that will undergo a final processing step in the postprocessor stage 150.

The processing stage 140 comprises the feature extraction step 141. Points that hold discriminative information about its surroundings are essential in the search for traffic signs. These points, called feature points, must be extracted from the image. The image used is the image-to-filter that was built by the pre-processing stage 130.

For the extraction of these feature points, the Hessian blob detector is used. In this detector, first the Hessian of the scale space is computed. This scale space is given by $$L(x,y,\sigma) = G(x,y,\sigma) ** \text{Image}(x,y),$$

with '**' denoting the two-dimensional convolution. Function G(x, y, σ) is the Gaussian function specified by $$G(x, y, \sigma) = \frac{1}{2\pi\sigma^2} e^{-\frac{x^2+y^2}{2\sigma^2}},$$

where $\sigma^2$ is the variance, which is in this case the scale of the scale space. This Gaussian function is optimal for scale space analysis. The Hessian of this function is computed by the matrix $$H(x, y, \sigma) = \begin{bmatrix} L_{xx}(x, y, \sigma) & L_{xy}(x, y, \sigma) \\ L_{xy}(x, y, \sigma) & L_{yy}(x, y, \sigma) \end{bmatrix},$$

in which $L_{ab}$(x, y, σ) stands for the convolution of the second-order derivative to a and b of the Gaussian-filtered image. The blobs are extracted from the Monge-Ampère operator, which is the scale-normalized determinant of the Hessian matrix, as given by $$\det(H(x,y,\sigma)) = \sigma^2 (L_{xx} L_{yy} - L_{xy}^2),$$

with $\sigma^2$ being the scale normalization.

The feature points are the maxima and minima in the filter results for several scales, which is spanned in a three-dimensional space. A threshold for the magnitude (absolute value)

of the extreme values is set to limit the number of feature points found. This means that only magnitudes above the threshold are considered. The accuracy of the scale is increased by interpolation, for example, using spline interpolation.

The feature points do not disclose information about the underlying traffic signs. Therefore, in order to classify the feature points, a description of these points is made in the feature description step 142. To describe the feature points, the vicinity of the point is used. The image from which the information about the vicinity is used, is the image-to-describe that was built by the pre-processing stage 130.

The descriptor designed is the 'color-presence descriptor'. The analyzed image region is divided in n×n sub-regions. In each sub-region, the colors are counted. Depending on the two colors that are mostly present in the sub-region, an informative number is given to the sub-region. All informative values of the sub-regions are combined into one descriptor. These sub-regions are the first layer in the hierarchy of templates. All sub-regions describe the small elements of the underlying traffic sign, and act as a small, partial or sub-template of a sign.

To enhance the descriptor, several representative values are computed. These representative values describe a general impression of the descriptor and are derived from the region around the feature point. More specifically, in the described embodiment, the analyzed image region is divided in just 2×2 sub-regions. In each sub-region the colors are again counted. The results of this counting determine an informative value describing the colors and give the representative values.

The feature matching step 143 of the method tries to match each descriptor to one or more descriptors from a library. Hence, a descriptor is matched to the library of small templates or descriptors from a library. To match a descriptor to a descriptor from the library, the number of differences is computed. If this difference number is smaller than the threshold given in the library, the descriptors are considered to match.

In this feature-matching step 143, the second layer in the hierarchy of templates becomes clear. The descriptor, which is the combination of all sub-regions as described in the last section, gives the information of a part of the traffic sign. It is compared to parts of the traffic signs available in the library.

If all of the main values do not match with the main values of the library descriptor, they are considered not to match. This saves the number of differences that needs to be computed significantly. The library can even be divided into several libraries. Which library should be used can be determined from the main values of the descriptor.

Figure 4:
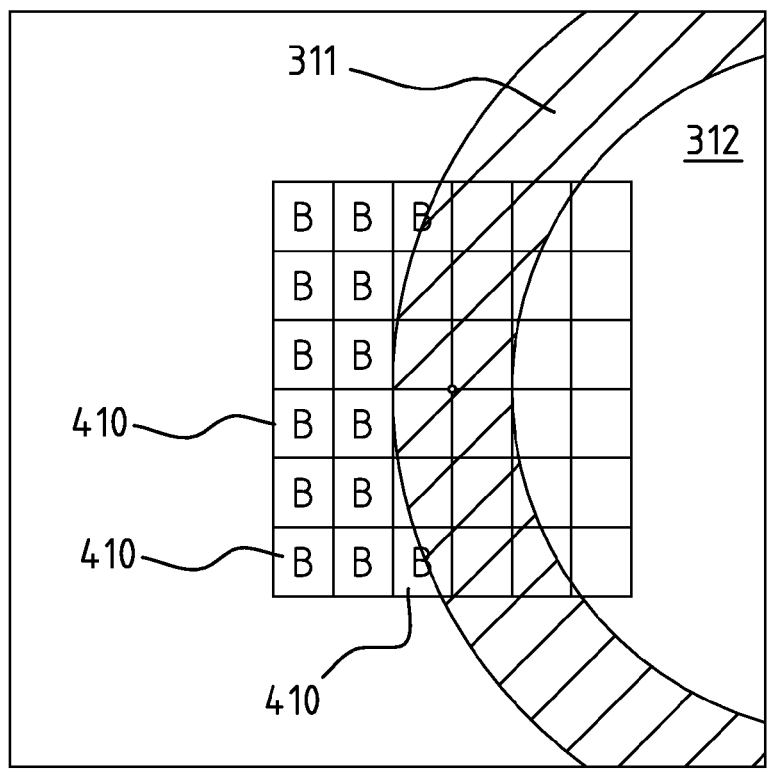
FIG. 4 illustrates a step from the flow chart of FIG. 1 as applied to an image in accordance with embodiments of the present disclosure.

A special property to reduce the influence of the background of the traffic signs is applied. A mask is used that belongs to each descriptor of the library, which indicates where the background pixels 410 would have a too large influence on the specific part of the descriptor. This concept is illustrated in FIG. 4, where background pixels 410 are labelled with 'B' and excluded from the comparison.

For the next step, the feature combining step 144, the parameters for each match are stored. These parameters are the location of the feature point, the scale, and the ID of the matching descriptor of the library.

The matches 510 (FIG. 5) of the last stage (small templates) are clues to the finding of complete traffic signs in the image. By combining these clues, traffic signs are actually located, for example by applying majority voting or a similar technique.

Figure 5:
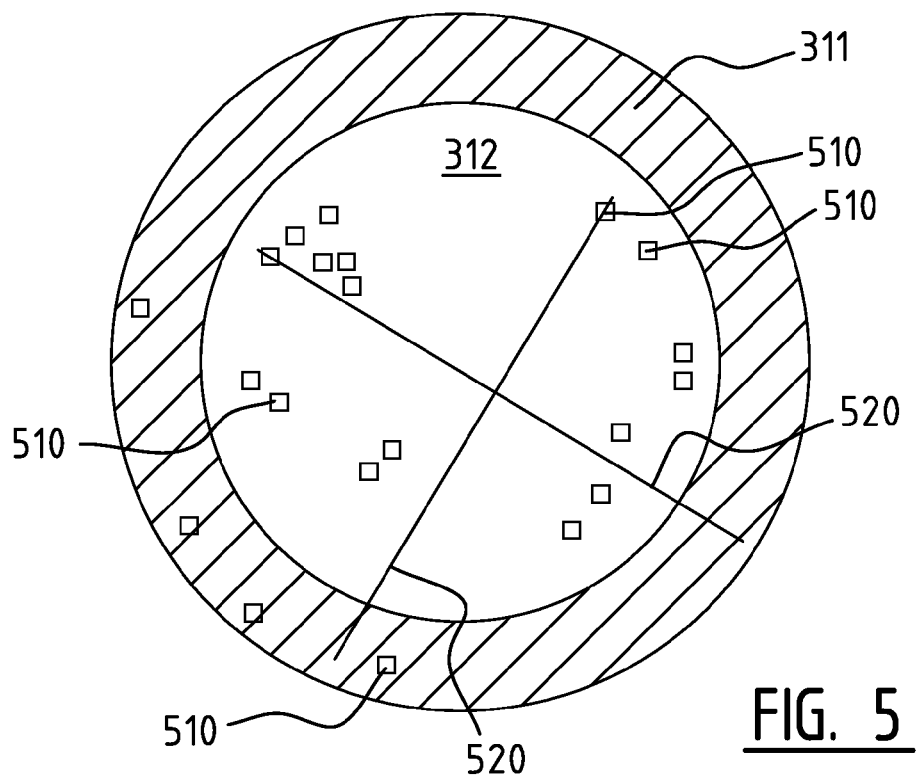
FIG. 5 illustrates a further step from the flow chart of FIG. 1 as applied to an image in accordance with embodiments of the present disclosure.

Before the matches 510 are used to locate possible traffic signs, the matches 510 are clustered by location. Only the matches 510 that belong to the same cluster can form traffic-sign candidates together. For every match 510, a line 520 on which the center of the traffic sign can be is computed. The length of this line depends on the scale of the found feature point compared to the scale of the matching point from the library. Then, two matches 510 are combined by computing the location of the crossing of the two lines 520, as illustrated in FIG. 5. If they cross each other, the proposed sizes for the traffic sign by both matches 510 are compared. If they are close, the center is stored. After all combinations of matches 510 are found, the centers are clustered to form the actual candidate traffic signs. A minimum of clustered centers is required to accept the candidate. This minimum depends on the size of the found traffic sign.

Figure 6:
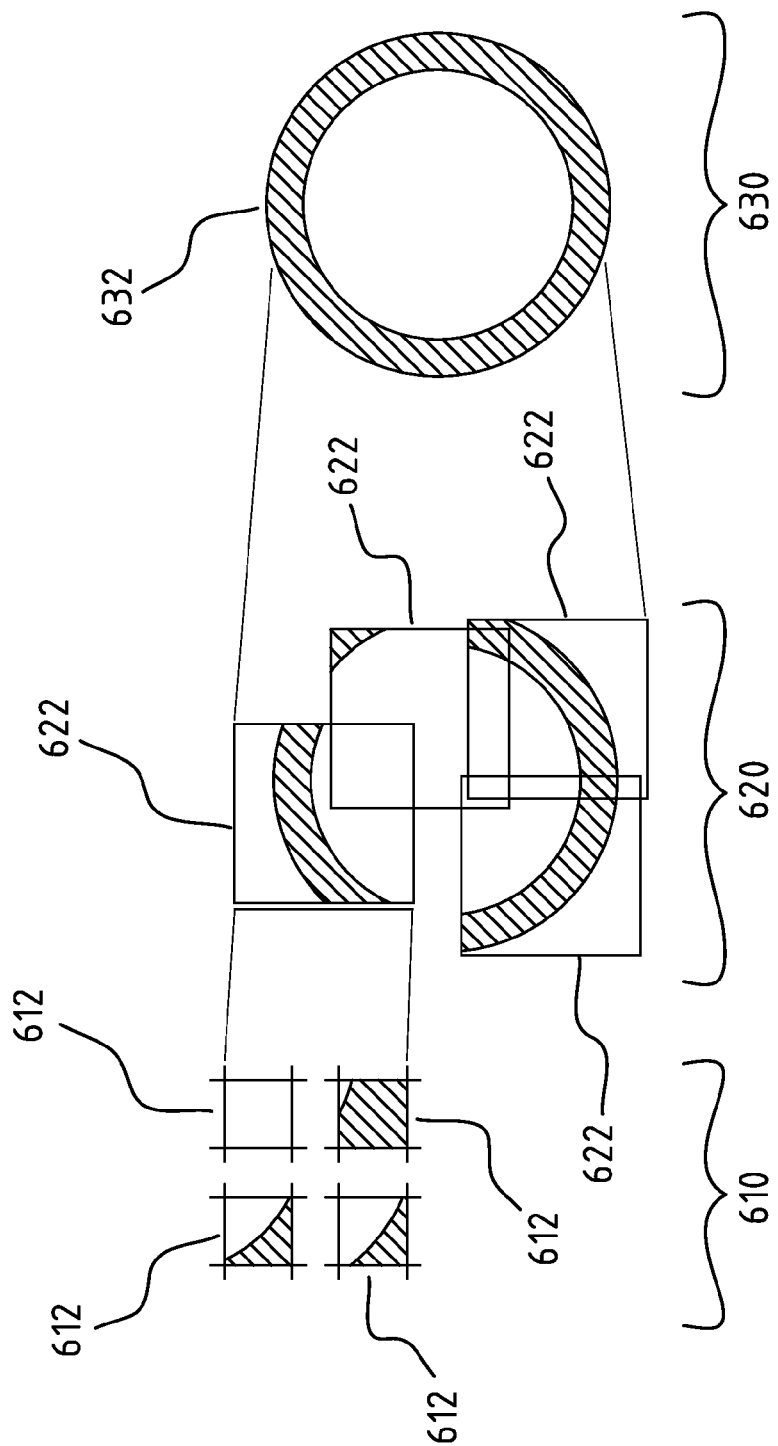
FIG. 6 illustrates templates used in a method according to embodiments of the present disclosure.

The combination that is created by this combining of the matches 510 indicates the third layer 630 (FIG. 6) in the hierarchy of templates. This level is further exploited in the post-processing stage.

The output of this step and thus of the processing stage 140, consists of candidate traffic signs with the location of the center, the size and the type (ID).

Figure 7:
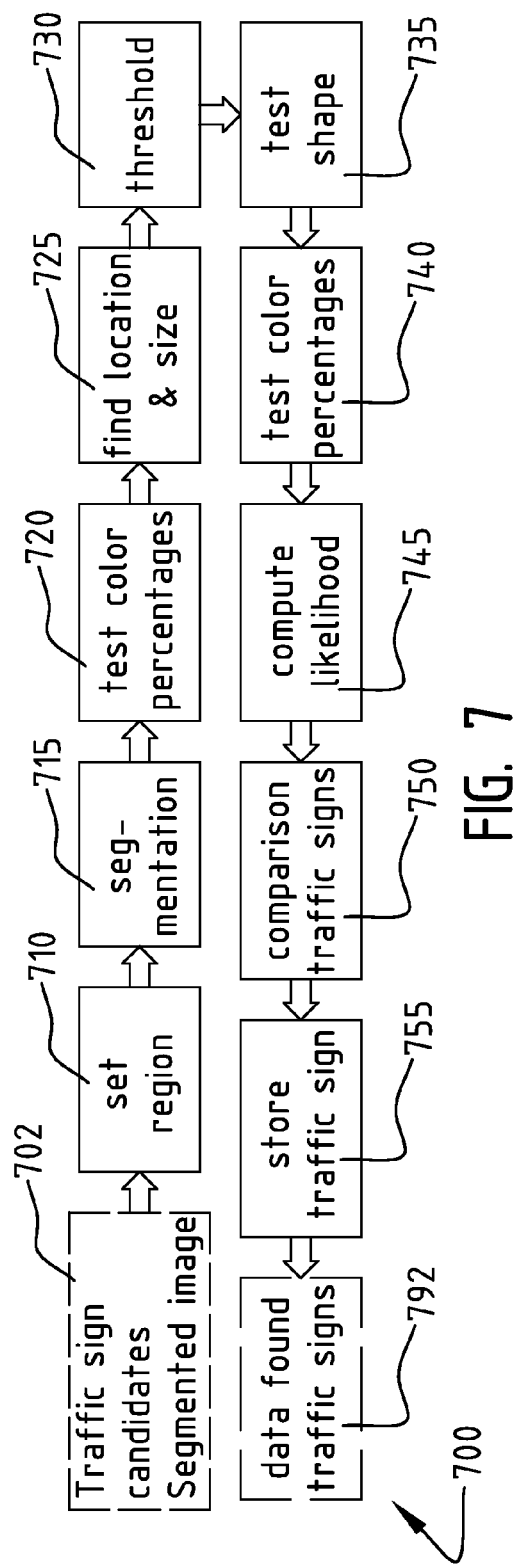
FIG. 7 illustrates a further flow chart of a step from the flow chart of FIG. 1 in accordance with embodiments of the present disclosure.

The final, or post-processing stage 150, retrieves the candidate traffic signs from the processing stage 140. To make the complete algorithm more reliable, these candidates are tested more thoroughly. As a result, false detections are rejected and correct detections get a value that indicates the accuracy. Also, the accuracy of the size and location of the correct detections are improved. The block diagram of the validation step is shown in FIG. 7, and the individual steps of this algorithm are described in the sequel.

The candidate traffic sign of the previous stage includes a center location and a size of the sign. Using these two parameters, a box fitted to contain the candidate traffic sign is determined in the set region step 710, even if the proposed size or location are not perfectly known. This region is used for the remainder of the steps and will be referred to as the 'search region'.

The region is already segmented during the pre-processing stage 130. However, the segmentation results are improved by removing noise using noise reduction filters in the segmentation step 715. This can be implemented by considering the surrounding pixels, and testing whether they have the same color. The color may change if too many surrounding pixels have a different color.

In the test color percentage step 720, the percentages of the colors in the center of the search region are determined. These percentages are compared to the percentages of the original traffic sign. If the percentages differ too much, the traffic sign is rejected.

In the 'find location and size' step 725, the third level 630 of hierarchical templates is used. To locate the possible traffic sign with more precision, slices are used. The library contains information about slices of the original traffic sign as a whole. These slices indicate the color transitions and the relative locations of these color transitions in both the horizontal and vertical direction. For several horizontal and vertical slices around the middle-point of the search region, the color transitions and relative locations are computed. The color transitions are compared with the ones of the slices of the library in order to determine the horizontal and vertical size and location of the traffic sign. The relative locations of the transitions indicate the horizontal and vertical size of the found sign. The number of slices matching to the library relative to the total slices tested is used to determine an intermediate likelihood indicator ranging from 0% (rather poor) to 100% (perfect).

During the previous step, an intermediate likelihood was obtained. If this likelihood is below some threshold, the traffic sign is rejected in the threshold step 730 and the remainder of the steps is skipped. By setting the threshold, the results of the validation step can be influenced.

If desired by the traffic sign found (this is stored in the library), the shape of the traffic sign can be tested using the size and location of the sign found in the test shape step 735. This shape comes from a transition between two colors. The dimensions of the shape are detected using the information of this color transition. The shape is validated with a precise template of the shape that must cover a minimal amount of the color transitions. The shape is validated with a precise template of the shape that must cover a minimal amount of the colour transitions.

Using the location and the size of the traffic sign found, another color-percentage check is executed in the test color percentages step 740. The percentages of all colors are calculated. Because of the known location and size, the thresholds for the different percentages are stricter than the center percentage check. Also, an upper limit for the color percentages is set. The thresholds depend on the percentages of the colors in the original traffic sign. If the sign is rejected, the following steps are skipped.

Using the knowledge about the center of the traffic sign and the size of the traffic sign, a likelihood indicator is computed in the compute likelihood step 745. Therefore, a total descriptor of the found traffic sign is computed. This total descriptor represents the spatial color information of the sign. The computed descriptor is compared to the total descriptor in the library. The distance between the descriptors gives the obtained detection likelihood.

There are traffic signs that are look-a-likes of each other. Therefore, it is possible that more options are proposed by the previous step and that more than one option reaches this step during the validation. Additionally, one traffic sign could incidentally vote for itself with two candidates. To find out which sign is present in the image actually, or which candidate is the actual version of the sign, every traffic sign that reaches this compare traffic signs step 750 is compared to the signs already found. If two signs that are the same are in the same neighborhood, the weakest is removed. If the signs that overlap are different, the strongest remains and the weakest becomes an alternative.

When the traffic sign reaches the store traffic sign step 755, it is stored. The stored parameters for each traffic sign are the type (ID), the likelihood, the location of the center, the sizes in the x-dimension and in the y-dimension and an indicator of the status of the found sign. The indicator tells whether it is an accepted or an alternative traffic sign.

Figure 8:
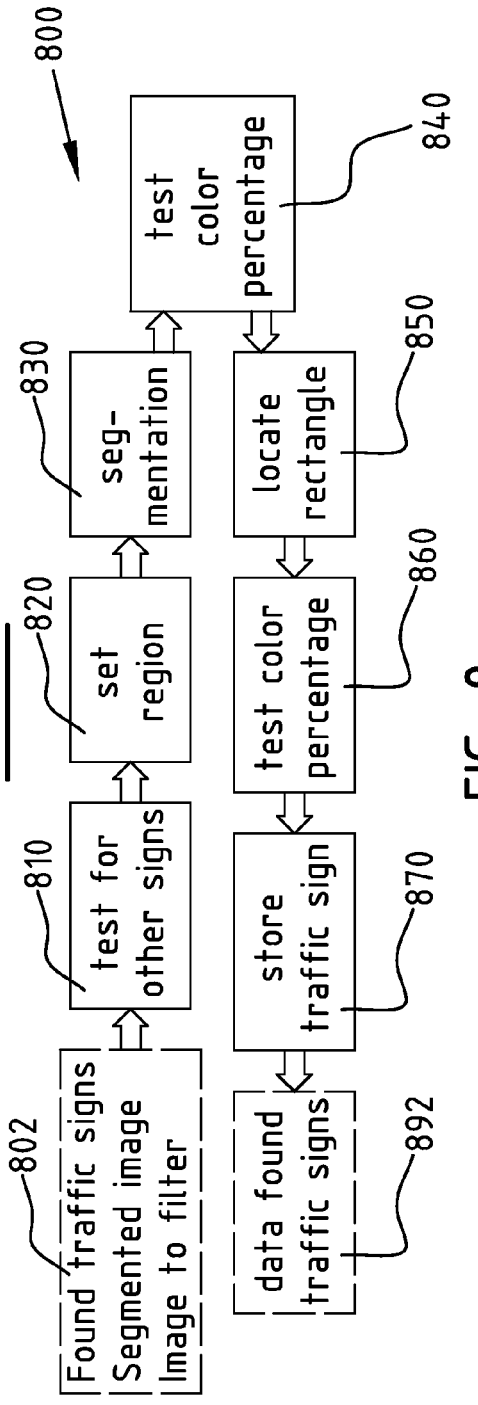
FIG. 8 shows a detail of flow chart of a method according to the present disclosure.

In an additional step (FIG. 8), a refinement of the results can be obtained by finding supplementary traffic signs. These signs, often white, are usually located underneath other traffic signs. By searching this area of each found traffic sign for such signs, most of these signs can be located.

In the test for other signs step 810, the area underneath the found traffic sign is investigated. If another sign is already located in this area, there will not be any other sign, so also not any supplementary sign. In that case, the remainder of the steps is skipped.

Otherwise in the set region step 820, the size and location of the found traffic sign are used to set the area in which the possible supplementary traffic sign should be. This area is called the search region in the following steps of the method.

In the segmentation step 830, the search region is segmented indicating the pixels that have the color of the supplementary sign using the segmentation result of the pre-processing stage 130, which is improved. This improvement contains noise removal and the adding of the possible text on the supplementary sign to the segmentation map.

In the case of supplementary traffic signs, there are several possible shapes they can have. However, all of them have an overlap in the upper half of the search region in the middle. In the subsequent test color percentage step 840, after calculating the percentage of the pixels belonging to the sign in the segmentation map of this middle area, this percentage is compared to a threshold. If the percentage is too low, the algorithm is halted at this step.

To find the bounding rectangle in the locate rectangle step 850, a rectangle is built using the segmentation map at first. Next, the image-to-filter is used to increase the accuracy of the last found side of the bounding box. The rectangle is built by trying to surround an—as large as possible—solid rectangle in the segmented image. The increase of accuracy is realized by computing differences, or parameters related to differences such as gradients, in the image-to-filter. These differences indicate edges that could not be seen in the segmented image.

In order to determine a likelihood indicator and to find out whether really a supplementary traffic sign is found, the percentage of the color of the sign in the bounding rectangle found is computed in the test color percentage step 860 and compared to a threshold. If the percentage is too low, the possible sign is rejected.

If the store traffic sign step 870 is reached, the supplementary sign is saved. This is done in the same way other traffic signs are saved. This means the ID indicating 'supplementary traffic sign', the likelihood indicator, which is the percentage of white found in the previous step, the location of the center and the size in the x-dimension and in the y-dimension. The indicator of the status of the found traffic sign is set to 'accepted'.

Instead of using a training set to train the system, a parent figure is created in a specific embodiment of the disclosure, for the generation of the library. All information relevant for the algorithm is extracted from this parent figure. This means that this information must be able to cope with noise, small deformations, different scales, etc. This is accomplished by the steps in the method: the information from the library is not taken for granted, levels of differences are allowed.

Figure 9:
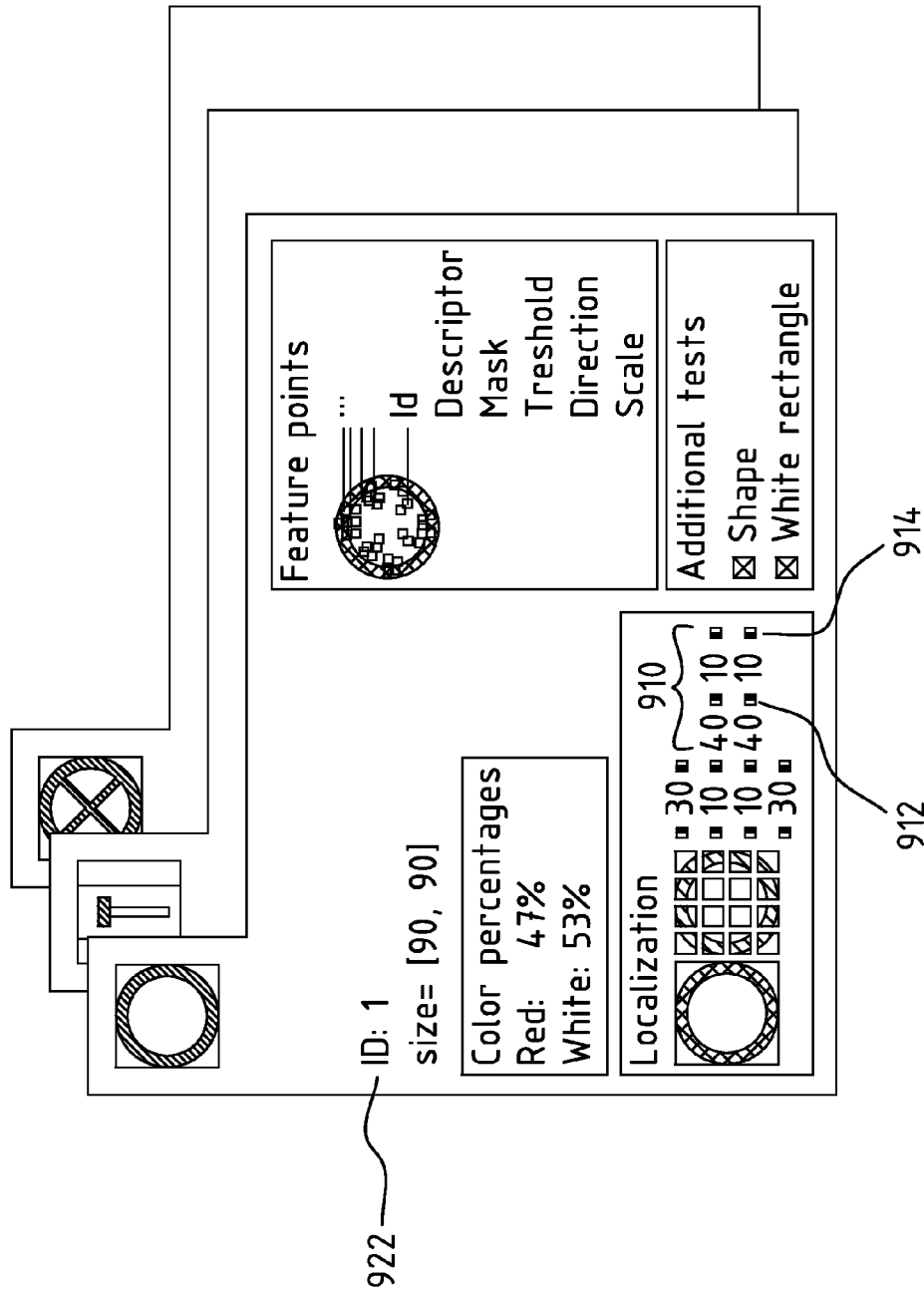
FIG. 9 illustrates an exemplary library with templates for use in a method according to embodiments of the present disclosure.

In the library (FIG. 9) a lot of information is stored. The steps of the method, including the information these steps require to be extracted from the parent figure, are the following:

Feature matching 143
    Descriptors for all feature points of the parent figure which can be used to match with the found descriptors
    Masks for each descriptor
    Thresholds for each descriptor Feature combining 144
    The direction to the center of the parent figure per feature point
    The scale per feature point
    Traffic sign ID of the parent figure per feature point Validation 151
    Color percentages of the parent figure
    Localization: slices of the parent figure
    Likelihood indicator: total descriptor of the parent figure
    Size in the x-dimension and the y-dimension
    Whether a specific shape check is desired
    Whether a refinement search is desired It should be noted that all embodiments described and shown herein are example embodiments. The person skilled in the art understands that many of the steps described for an embodiment may be replaced by alternative steps well known to the person skilled in the art. Furthermore, some steps are not essential, but result in an advantageous effect and are therefore comprised in one of the preferred embodiments. They may, however, be omitted without departing from the present closure. The scope of protection sought is defined by the claims.

In certain embodiments of the present disclosure, a method is provided comprising preparing an input image, locating at least one candidate traffic sign in the prepared input image, rejecting one or more false detections of the located at least one candidate traffic sign, and attributing a value that indicates an accuracy of one or more correct detections of the at least one located candidate traffic sign, wherein locating the at least one candidate traffic sign in the prepared input image comprises identifying a plurality of feature points in the prepared input image, constructing, using one or more processors, a descriptor for each of the plurality of feature points, wherein the descriptor includes a description of a vicinity associated with each of the plurality of feature points, providing a library comprising a hierarchy of a plurality of templates corresponding to a plurality of traffic signs, each one of the plurality of templates corresponding to a specific traffic sign and comprising a plurality of sub-templates that represent a part of the specific traffic sign, wherein each one of the plurality of templates comprises an image of the specific traffic sign to which it corresponds and the plurality of sub-templates each comprise a different part of the image of the specific traffic sign, matching the descriptor constructed for each of the plurality of feature points to the plurality of sub-templates in the library or to at least one of a plurality of corresponding descriptors derived from the plurality of sub-templates, combining the plurality of sub-templates matched with the descriptor constructed for each of the plurality of feature points to form the at least one candidate traffic sign, storing a location and a scale of each of the plurality of feature points for which a corresponding descriptor has been matched to a sub-template, computing a line that corresponds to a center of the at least one candidate traffic sign for the descriptor constructed for each of the plurality of feature points and matched to the plurality of sub-templates in the library that correspond to the at least one candidate traffic sign, if it is determined that two or more lines computed for the descriptor constructed for each of the plurality of feature points and matched to the at least one of the plurality of sub-templates in the library that correspond to the at least one candidate traffic sign cross, storing information related to the crossing of the lines as a candidate center of the at least one candidate traffic sign if the scale stored for the matches in said combination, are within a predetermined range, clustering the stored information related to the crossing of lines as a candidate center to determine possible centers, and combining the sub-templates corresponding to the cluster of possible centers to form the at least one candidate traffic sign.

Certain aspects include that the confidence indication of the detection/recognition is split into an indication for the at least one candidate traffic sign without a traffic sign border and a confidence indication of the at least one candidate traffic sign in which the traffic sign border is considered.

Certain aspects include that matching comprises comparing colors in the prepared input image to a color description in a template.

Certain aspects include that each of the plurality of templates defines a background mask, and wherein the background mask determines one or more areas that are ignored during matching, wherein the one or more areas that are ignored during matching comprises a group of pixels and/or a group of sub-pixels.

Certain aspects include that the stored information related to the crossing of lines as a candidate center are clustered to determine the possible centers and the sub-templates corresponding to the cluster of possible centers are combined to form the at least one candidate traffic sign after all combinations of matches corresponding to the at least one candidate traffic sign are determined.

In some aspects of the present disclosure, a non-transitory computer-readable medium is provided having embodied thereon computer executable instructions which, when executed by a computer, causes the computer to prepare an input image, to locate at least one candidate traffic sign in the prepared input image, to reject one or more false detections of the located at least one candidate traffic sign, to attribute a value that indicates an accuracy of one or more correct detections of the at least one located candidate traffic sign, to identify a plurality of feature points in the prepared input image, to construct a descriptor for each of the plurality of feature points, wherein the descriptor includes a description of a vicinity associated with each of the plurality of feature points, to provide a library comprising a hierarchy of a plurality of templates corresponding to a plurality of traffic signs, each one of the plurality of templates corresponding to a specific traffic sign and comprising a plurality of sub-templates that represent a part of the specific traffic sign, wherein each one of the plurality of templates comprises an image of the specific traffic sign to which it corresponds and the plurality of sub-templates each comprise a different part of the image of the specific traffic sign, to match the descriptor constructed for each of the plurality of feature points to the plurality of sub-templates in the library or to at least one of a plurality of corresponding descriptors derived from the plurality of sub-templates, to combine the plurality of sub-templates matched with the descriptor constructed for each of the plurality of feature points to form the at least one candidate traffic sign, to store a location and a scale of each of the plurality of feature points for which a corresponding descriptor has been matched to a sub-template, to compute a line that corresponds to a center of the at least one candidate traffic sign for the descriptor constructed for each of the plurality of feature points and matched to the plurality of sub-templates in the library that correspond to the at least one candidate traffic sign, if it is determined that two or more lines computed for the descriptor constructed for each of the plurality of feature points and matched to the at least one of the plurality of sub-templates in the library that correspond to the at least one candidate traffic sign cross, to store information related to the crossing of the lines as a candidate center of the at least one candidate traffic sign if the scale stored for the matches in said combination, are within a predetermined range, to cluster the stored information related to the crossing of lines as a candidate center to determine possible centers, and to combine the sub-templates corresponding to the cluster of possible centers to form the at least one candidate traffic sign.

Certain aspects include that a template in the library comprises an indication of the confidence of the detection/recognition.

Certain aspects include that the computer executable instructions which, when executed by a computer, further causes the computer to split the confidence indication of the detection/recognition into an indication for the at least one candidate traffic sign without a traffic sign border and a confidence indication of the at least one candidate traffic sign in which the traffic sign border is considered.

Certain aspects include that the computer executable instructions which, when executed by a computer, further causes the computer to compare colors in the prepared input image to a color description in a template.

Certain aspects include that each of the plurality of templates defines a background mask, and wherein the background mask determines one or more areas that are ignored during matching, wherein the one or more areas that are ignored during matching comprises a group of pixels and/or a group of sub-pixels.

Certain aspects include that the computer executable instructions which, when executed by a computer, further causes the computer to cluster the stored information related to the crossing of lines as a candidate center are to determine the possible centers, and to combine the sub-templates corresponding to the cluster of possible centers to form the at least one candidate traffic sign after all combinations of matches corresponding to the at least one candidate traffic sign are determined.

In some aspects of the present disclosure, an apparatus is provided comprising one or more processors, and a memory storing instructions which, when executed by the one or more processors, causes the one or more processors to prepare an input image, to locate at least one candidate traffic sign in the prepared input image, to reject one or more false detections of the located at least one candidate traffic sign, to a value that indicates an accuracy of one or more correct detections of the at least one located candidate traffic sign, to identify a plurality of feature points in the prepared input image, to construct a descriptor for each of the plurality of feature points, wherein the descriptor includes a description of a vicinity associated with each of the plurality of feature points, to provide a library comprising a hierarchy of a plurality of templates corresponding to a plurality of traffic signs, each one of the plurality of templates corresponding to a specific traffic sign and comprising a plurality of sub-templates that represent a part of the specific traffic sign, wherein each one of the plurality of templates comprises an image of the specific traffic sign to which it corresponds and the plurality of sub-templates each comprise a different part of the image of the specific traffic sign, to match the descriptor constructed for each of the plurality of feature points to the plurality of sub-templates in the library or to at least one of a plurality of corresponding descriptors derived from the plurality of sub-templates, to combine the plurality of sub-templates matched with the descriptor constructed for each of the plurality of feature points to form the at least one candidate traffic sign, to store a location and a scale of each of the plurality of feature points for which a corresponding descriptor has been matched to a sub-template, to compute a line that corresponds to a center of the at least one candidate traffic sign for the descriptor constructed for each of the plurality of feature points and matched to the plurality of sub-templates in the library that correspond to the at least one candidate traffic sign, if it is determined that two or more lines computed for the descriptor constructed for each of the plurality of feature points and matched to the at least one of the plurality of sub-templates in the library that correspond to the at least one candidate traffic sign cross, to store information related to the crossing of the lines as a candidate center of the at least one candidate traffic sign if the scale stored for the matches in said combination, are within a predetermined range, to cluster the stored information related to the crossing of lines as a candidate center to determine possible centers, and to combine the sub-templates corresponding to the cluster of possible centers to form the at least one candidate traffic sign.

Certain aspects include that a template in the library comprises an indication of the confidence of the detection/recognition.

Certain aspects include that the memory is further configured to store instructions which, when executed by a computer, causes the one or more processors to split the confidence indication of the detection/recognition into an indication for the at least one candidate traffic sign without a traffic sign border and a confidence indication of the at least one candidate traffic sign in which the traffic sign border is considered.

Certain aspects include that the memory is further configured to store instructions which, when executed by a computer, causes the one or more processors to compare colors in the prepared input image to a color description in a template.

Certain aspects include that each of the plurality of templates defines a background mask, and wherein the background mask determines one or more areas that are ignored during matching, wherein the one or more areas that are ignored during matching comprises a group of pixels and/or a group of sub-pixels.

Certain aspects include that the memory is further configured to store instructions which, when executed by a computer, causes the one or more processors to cluster the stored information related to the crossing of lines as a candidate center are to determine the possible centers, and to combine the sub-templates corresponding to the cluster of possible centers to form the at least one candidate traffic sign after all combinations of matches corresponding to the at least one candidate traffic sign are determined.

Various other modifications and alterations in the structure and method of operation of this disclosure will be apparent to those skilled in the art without departing from the scope and spirit of the embodiments of the present disclosure. Although the present disclosure has been described in connection with particular embodiments, it should be understood that the present disclosure as claimed should not be unduly limited to such particular embodiments. It is intended that the following claims define the scope of the present disclosure and that structures and methods within the scope of these claims and their equivalents be covered thereby.

The invention claimed is:
1. A method, comprising:
locating at least one candidate traffic sign in the prepared input image;
rejecting one or more false detections of the located at least one candidate traffic sign; and
attributing a value that indicates an accuracy of one or more correct detections of the at least one located candidate traffic sign;
wherein locating the at least one candidate traffic sign in the prepared input image comprises:
identifying a plurality of feature points in the prepared input image;
constructing, using one or more processors, a descriptor for each of the plurality of feature points, wherein the descriptor includes a description of a vicinity associated with each of the plurality of feature points;
providing a library comprising a hierarchy of a plurality of templates corresponding to a plurality of traffic signs, each one of the plurality of templates corresponding to a specific traffic sign and comprising a plurality of sub-templates that represent a part of the specific traffic sign, wherein each one of the plurality of templates comprises an image of the specific traffic sign to which it corresponds and the plurality of sub-templates each comprise a different part of the image of the specific traffic sign;
matching the descriptor constructed for each of the plurality of feature points to the plurality of sub-tem- plates in the library or to at least one of a plurality of corresponding descriptors derived from the plurality of sub-templates;

combining the plurality of sub-templates matched with the descriptor constructed for each of the plurality of feature points to form the at least one candidate traffic sign;

storing a location and a scale of each of the plurality of feature points for which a corresponding descriptor has been matched to a sub-template;

computing a line that corresponds to a center of the at least one candidate traffic sign for the descriptor constructed for each of the plurality of feature points and matched to the plurality of sub-templates in the library that correspond to the at least one candidate traffic sign;

if it is determined that two or more lines computed for the descriptor constructed for each of the plurality of feature points and matched to the at least one of the plurality of sub-templates in the library that correspond to the at least one candidate traffic sign cross, storing information related to the crossing of the lines as a candidate center of the at least one candidate traffic sign if the scale stored for the matches in said combination, are within a predetermined range;

clustering the stored information related to the crossing of lines as a candidate center to determine possible centers; and combining the sub-templates corresponding to the cluster of possible centers to form the at least one candidate traffic sign.

2. The method of claim 1, wherein a template in the library comprises an indication of the confidence of the detection/recognition.

3. The method of claim 2, wherein the confidence indication of the detection/recognition is split into an indication for the at least one candidate traffic sign without a traffic sign border and a confidence indication of the at least one candidate traffic sign in which the traffic sign border is considered.

4. The method of claim 1, wherein matching comprises comparing colors the prepared input image to color description in a template.

5. The method of claim 1, wherein each of the plurality of templates defines a background mask, and wherein the background mask determines one or more areas that are ignored during matching, wherein the one or more areas that are ignored during matching comprises a group of pixels and/or a group of sub-pixels.

6. The method of claim 1, wherein the stored information related to the crossing of lines as a candidate center are clustered to determine the possible centers and the sub-templates corresponding to the cluster of possible centers are combined to form the at least one candidate traffic sign after all combinations of matches corresponding to the at least one candidate traffic sign are determined.

7. A non-transitory computer-readable medium having embodied thereon computer executable instructions which, when executed by a computer, causes the computer to prepare an input image, to locate at least one candidate traffic sign in the prepared input image, to reject one or more false detections of the located at least one candidate traffic sign, to attribute a value that indicates an accuracy of one or more correct detections of the at least one located candidate traffic sign, to identify a plurality of feature points in the prepared input image, to construct a descriptor for each of the plurality of feature points, wherein the descriptor includes a description of a vicinity associated with each of the plurality of feature points, to provide a library comprising a hierarchy of a plurality of templates corresponding to a plurality of traffic signs, each one of the plurality of templates corresponding to a specific traffic sign and comprising a plurality of sub-templates that represent a part of the specific traffic sign, wherein each one of the plurality of templates comprises an image of the specific traffic sign to which it corresponds and the plurality of sub-templates each comprise a different part of the image of the specific traffic sign, to match the descriptor constructed for each of the plurality of feature points to the plurality of sub-templates in the library or to at least one of a plurality of corresponding descriptors derived from the plurality of sub-templates, to combine the plurality of sub-templates matched with the descriptor constructed for each of the plurality of feature points to form the at least one candidate traffic sign, to store a location and a scale of each of the plurality of feature points for which a corresponding descriptor has been matched to a sub-template, to compute a line that corresponds to a center of the at least one candidate traffic sign for the descriptor constructed for each of the plurality of feature points and matched to the plurality of sub-templates in the library that correspond to the at least one candidate traffic sign, if it is determined that two or more lines computed for the descriptor constructed for each of the plurality of feature points and matched to the at least one of the plurality of sub-templates in the library that correspond to the at least one candidate traffic sign cross, to store information related to the crossing of the lines as a candidate center of the at least one candidate traffic sign if the scale stored for the matches in said combination, are within a predetermined range, to cluster the stored information related to the crossing of lines as a candidate center to determine possible centers, and to combine the sub-templates corresponding to the cluster of possible centers to form the at least one candidate traffic sign.

8. The computer-readable medium of claim 7, wherein a template in the library comprises an indication of the confidence of the detection/recognition.

9. The computer-readable medium of claim 8, wherein the computer executable instructions which, when executed by a computer, further causes the computer to split the confidence indication of the detection/recognition into an indication for the at least one candidate traffic sign without a traffic sign border and a confidence indication of the at least one candidate traffic sign in which the traffic sign border is considered.

10. The computer-readable medium of method of claim 7, wherein the computer executable instructions which, when executed by a computer, further causes the computer to compare colors in the prepared input image to a color description in a template.

11. The computer-readable medium of claim 7, wherein each of the plurality of templates defines a background mask, and wherein the background mask determines one or more areas that are ignored during matching, wherein the one or more areas that are ignored during matching comprises a group of pixels and/or a group of sub-pixels.

12. The computer-readable medium of claim 7, wherein the computer executable instructions which, when executed by a computer, further causes the computer to cluster the stored information related to the crossing of lines as a candidate center are to determine the possible centers, and to combine the sub-templates corresponding to the cluster of possible centers to form the at least one candidate traffic sign after all combinations of matches corresponding to the at least one candidate traffic sign are determined.

13. An apparatus, comprising:
one or more processors; and
a memory storing instructions which, when executed by the one or more processors, causes the one or more processors to prepare an input image, to locate at least one candidate traffic sign in the prepared input image, to reject one or more false detections of the located at least one candidate traffic sign, to a value that indicates an accuracy of one or more correct detections of the at least one located candidate traffic sign, to identify a plurality of feature points in the prepared input image, to construct a descriptor for each of the plurality of feature points, wherein the descriptor includes a description of a vicinity associated with each of the plurality of feature points, to provide a library comprising a hierarchy of a plurality of templates corresponding to a plurality of traffic signs, each one of the plurality of templates corresponding to a specific traffic sign and comprising a plurality of sub-templates that represent a part of the specific traffic sign, wherein each one of the plurality of templates comprises an image of the specific traffic sign to which it corresponds and the plurality of sub-templates each comprise a different part of the image of the specific traffic sign, to match the descriptor constructed for each of the plurality of feature points to the plurality of sub-templates in the library or to at least one of a plurality of corresponding descriptors derived from the plurality of sub-templates, to combine the plurality of sub-templates matched with the descriptor constructed for each of the plurality of feature points to form the at least one candidate traffic sign, to store a location and a scale of each of the plurality of feature points for which a corresponding descriptor has been matched to a sub-template, to compute a line that corresponds to a center of the at least one candidate traffic sign for the descriptor constructed for each of the plurality of feature points and matched to the plurality of sub-templates in the library that correspond to the at least one candidate traffic sign, if it is determined that two or more lines computed for the descriptor constructed for each of the plurality of feature points and matched to the at least one of the plurality of sub-templates in the library that correspond to the at least one candidate traffic sign cross, to store information related to the crossing of the lines as a candidate center of the at least one candidate traffic sign if the scale stored for the matches in said combination, are within a predetermined range, to cluster the stored information related to the crossing of lines as a candidate center to determine possible centers, and to combine the sub-templates corresponding to the cluster of possible centers to form the at least one candidate traffic sign.

14. The apparatus of claim 13, wherein a template in the library comprises an indication of the confidence of the detection/recognition.

15. The apparatus of claim 14, wherein the memory is further configured to store instructions which, when executed by a computer, causes the one or more processors to split the confidence indication of the detection/recognition into an indication for the at least one candidate traffic sign without a traffic sign border and a confidence indication of the at least one candidate traffic sign in which the traffic sign border is considered.

16. The apparatus of method of claim 13, the memory is further configured to store instructions which, when executed by a computer, causes the one or more processors to compare colors in the prepared input image to a color description in a template.

17. The apparatus of claim 13, wherein each of the plurality of templates defines a background mask, and wherein the background mask determines one or more areas that are ignored during matching, wherein the one or more areas that are ignored during matching comprises a group of pixels and/or a group of sub-pixels.

18. The apparatus of claim 13, the memory is further configured to store instructions which, when executed by a computer, causes the one or more processors to cluster the stored information related to the crossing of lines as a candidate center are to determine the possible centers, and to combine the sub-templates corresponding to the cluster of possible centers to form the at least one candidate traffic sign after all combinations of matches corresponding to the at least one candidate traffic sign are determined.

* * * * *

UNITED STATES PATENT AND TRADEMARK OFFICE
CERTIFICATE OF CORRECTION

PATENT NO. : 9,129,156 B2  
APPLICATION NO. : 13/881856  
DATED : September 8, 2015  
INVENTOR(S) : Ernst David Herbschleb et al.

It is certified that error appears in the above-identified patent and that said Letters Patent is hereby corrected as shown below:

In the Claims

Column 12, Line 41, Claim 1, below "comprising:" insert -- preparing an input image; --

Column 13, Line 41, Claim 4, after "colors" insert -- in --

Column 13, Line 41, Claim 4, after "to" insert -- a --

Signed and Sealed this  
Twenty-eighth Day of June, 2016

Michelle K. Lee  
*Director of the United States Patent and Trademark Office*